Figure 1:
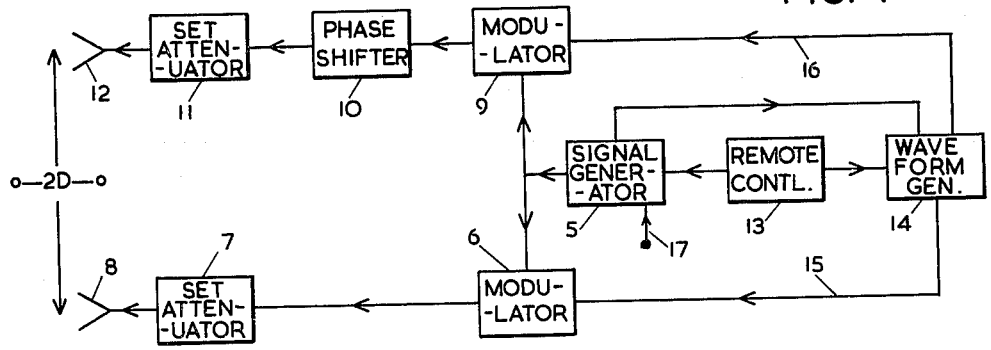

Oct. 26, 1965   K. D. MILLS ETAL   3,214,758

DISTRIBUTED RADAR TARGET SIMULATOR

Filed Nov. 26, 1962

3,214,758
DISTRIBUTED RADAR TARGET SIMULATOR
Kenneth D. Mills, Ancaster, Ontario, and Harry Webber, Dundas, Ontario, Canada, assignors to Canadian Westinghouse Company Limited, Hamilton, Ontario, Canada, a company of Canada
Filed Nov. 26, 1962, Ser. No. 239,997
5 Claims. (Cl. 343—17.7)

This invention relates to radar testing equipment and in particular to such equipment designed to simulate a distributed target.

It is common practise to test radar equipment by means of generating a signal similar to the reflected signal produced by the radar system is normal operation. In most cases this simulated target, as it may be called, is radiated from an antenna and therefore appears to the radar equipment under test as a single relatively small target. Certain radar equipment, however, is designed to display large targets in a particular manner. This is true for example with respect to airborne radar equipment which must display ground returns and depending upon the sophistication of the radar equipment make certain use of such ground returns. Obviously the ground, when viewed from an aircraft, presents a large area encompassing the whole antenna pattern and to properly test equipment which is responsive to this type of target, it is necessary that the simulation also represent such a target which may be referred to as a distributed target.

It will therefore be necessary that the simulated echo be radiated from many locations subtending angles at the radar antenna comparable to the angle of the field of view of the antenna when in flight.

To accomplish this the simulated target may be radiated from a plurality of spaced antennas. Of course, if a sufficient number of antennas are used, this could very closely approximate the effect of a large distributed target. To obtain the proper duration of ground returns to simulate a distributed target at a specified range and angle relative to the boresight of the antenna system, it will be necessary to produce a specific delay between returns from each extremity of the simulated distributed target. On the other hand, the problem of radiating such signals from so many antennas may become quite difficult. If a small number of antennas are used, two for example, and both are equally energized with identical signals, then the result may be a simulation of a target lying midway between the two antennas. If the antennas are energized alternately then they may appear to the radar system as two targets angularly spaced relative to the boresight of the radar system, the value of the angle depending upon the actual physical spacing of the antennas.

The problem however is to simulate a distributed target and as may be appreciated, a combination of the foregoing modes of operation provides the solution.

When both antennas are energized with the same signal, that is in the same phase and frequency, the apparent position of the source will depend upon the relative amplitudes of the signals supplied to each antenna. If now the relative amplitudes are changed, the apparent position of the source will change. It can be shown that the apparent location of the source as viewed from the radar equipment under test, depends upon three variables.

First, the location and spacing of the two antennas used in the test equipment, second the relative amplitude of the signals supplied to the two test antennas, and lastly, the relative phase angle of the signals applied to the two test antennas. This latter requirement is particularly critical since a phase angle error between the signals applied to the test antennas may give rise to quite deceptive results any may produce a simulation of a target completely outside the general location of the test antennas. The degree of importance of these variables also depends upon the nature of the sensing system of the radar system whether it be phase or amplitude sensitive primarly.

From the foregoing it will be seen that by means of adjusting the variables referred to, it is possible to simulate a target in various locations relative to the spaced antennas. By changing one of the variables, it is possible to change the apparent location of the target. By continually changing such variable, it is possible to simulate a distributed target.

In accordance with our invention, we provide a radar test equipment having at least two antennas arranged in a suitable test area, a source of signals simulating the normal signal produced by a reflection of the energy transmitted from the radar transmitter, and means to control the amplitude and duration of the portion of said signals applied to each of said antennas, whereby the apparent source of the signal received by the radar equipment under test, moves from a location adjacent one of said antenna to a location adjacent another of said antenna and having a duration representative of the illuminated portion of the target.

Figure 2:
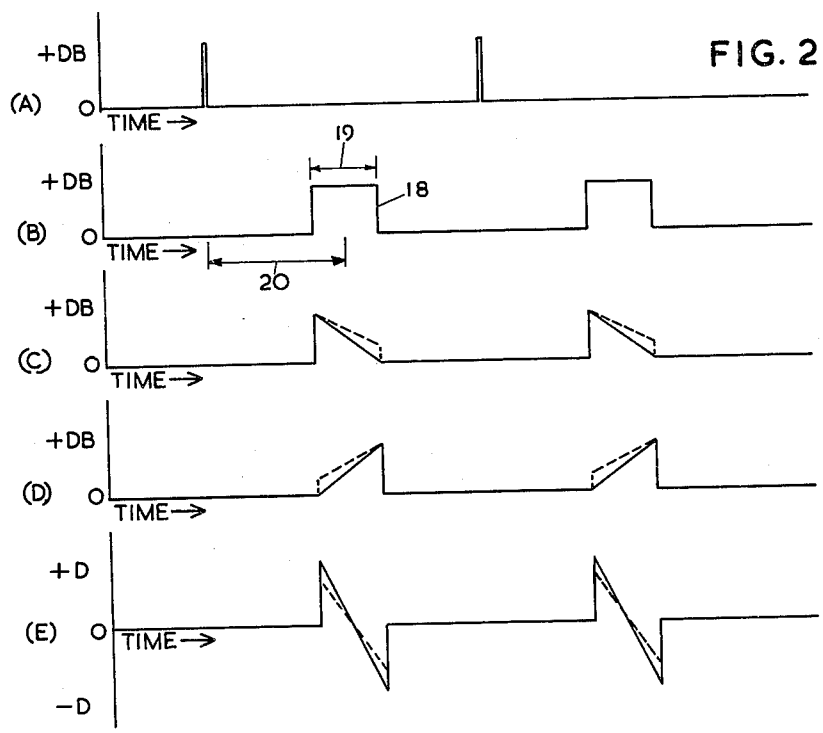
Figure 3:
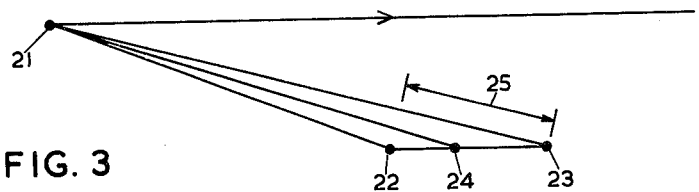

A clearer understanding of our invention may be had from the following description in which:

FIGURE 1 is a block diagram of a radar test equipment in accordance with our invention, FIGURE 2 is a series of graphical representations of conditions in the system which are of assistance in explaining its operation, FIGURE 3 is a geometric representation of the situation which is to be simulated.

Considering first FIGURE 1 there is shown a signal generator 5, connected through modulator 6 and set attenuators 7 to antenna 8 and simularly connected through modulator 9 and phase shifter 10 and set attenuator 11 to antenna 12. A remote control device 13 supplies certain control signals to the signal generator 5 and to the waveform generator 14. Control signals generated by the waveform generator 14 are applied through conductors 15 and 16 to modulators 6 and 9, respectively. Certain reference information is supplied to the signal generator 5 from terminal 17 and to the waveform generator 14 from signal generator 5.

The operation of the system may be explained as follows:

The signal generator 5 produces a signal which corresponds in frequency, power and other characteristics to a reflection from a target as produced by the radiation from the radar equipment under test. For example, if the radar equipment under test is a pulse equipment with a transmitter transmitting pulses of continuous wave relatively constant frequency RF energy, this energy in normal operation is reflected from targets and returned to the radar equipment where it is received. The radar test equipment produces a signal similar to such a reflection. The signal generator requires certain information input to terminal 17 to enable it to maintain the same frequency and pulse recurrence frequency as the radar equipment under test. Such a signal generator is well known in the art and a preferred form is shown in co-pending application Serial No. 206,455, filed June 29, 1962, in the name of Dennis A. Stonelake, entitled, "Automatic Frequency Control for Radar Test Apparatus," and assigned to the assignee of the present application.

The output from this generator is then to be applied to the two antennas 8 and 12. However, in the path of each antenna from the signal generator, are modulators 6 and 9 respectively. These modulators are capable of varying the transmission of energy through the path in accordance with a fixed law and in accordance with the signals applied to conductors 15 and 16. When it is desired to simulate a distributed target, certain control signals are applied from the remote control device 13 to energize the signal generator and establish a particular mode of operation. A control signal is also sent to the waveform generator 14 causing it to commence operation.

The waveform generator is capable of producing an output sufficient to cause the modulators 6 and 9 to vary in accordance with the output from the generator 14 and to vary the energy transmitted therethrough over an appreciable amplitude range.

The waveforms generated by the waveform generator and applied to conductors 15 and 16 are repetitive and reciprocal. Typical waveforms are ramp functions having reverse slopes, the ramp functions recurring at the pulse recurrence frequency of the system and delayed from the radar transmitter pulse an amount representative of the target range and having a duration representative of the area of the distributed target illuminated. Their relationship to the pulse recurrence frequency of the system is determined by means of the timing signal from signal generator 5 which is applied to the waveform generator.

With the application of such waveforms to conductors 15 and 16 modulators 6 and 9 will cause the signal to be radiated first primarily from antenna 8 and then gradually be transferred to antenna 12, one antenna radiating a maximum signal at the beginning of the period and the other antenna radiating a maximum signal at the end of the period. It will also be noted that in the path of antenna 12 from the modulator 9, is phase shifter 10. This device is inserted to enable adjustment of the phase of the signal radiated from antenna 12 relative to the signal radiated from antenna 8. The importance of this adjustment has been previously pointed out and by means of this phase shifter, the relative phase can be adjusted to essentially zero.

Also in the path of both antennas from their modulators 6 and 9, are pair attenuators which may be adjusted to ensure that with the modulators 6 and 9 fully conductive, the signal radiated from antennas 8 and 12 is essentially equal. As this was one of the other variables referred to initially, it will be evident that this adjustment also is of importance.

Considering now FIGURE 2 there is shown a series of graphs illustrating the waveforms at various points in this system under various conditions. At (A) there is shown a graphical representation of the transmitter pulse of the radar system being tested, displayed on a graph having a vertical axis in decibels and horizontal axis in time. It will be noted that the pulses are of course repetitious at the particular repetition rate of the system. At (B) is shown the pulse output of the signal generator 5. This again is displayed on a basis of a vertical axis in decibels and horizontal axis in time however the decibel axis is not to the same scale as that of the graph at (A). The dimension 20 denotes the time delay between the main transmitter pulse of the radar system being tested and the centre point of the pulse produced by the signal generator 5. This dimension 20 represents the average range of the target being simulated that is the range along the boresight of the radar system. Dimension 19 illustrates the duration of the impulse and will of course depend upon the physical length of the distributed target which it is desired to simulate. Item 18 represents the pulse output from signal generator 5 and it will be noted that this pulse is also repetitious, at the repetition rate of the radar system and delayed after the transmitter pulse in accordance with the desired range. The amount of delay of this pulse is determined by the adjustment of the remote control device 13. At (C) is shown a ramp function and a similar but reverse slope function is shown at (D). Both of these pulses are generated in the waveform generator and it will be noted both commence at the same time as pulse 18 shown at (B) in FIGURE 2 and both terminate at the same time as pulse 18. The timing of these pulses is determined by the signal representative of pulse 18 which is applied to the waveform generator 5. These ramp functions may be illustrative of either the waveform generated by the waveform generator 14 or representative of the insertion loss of the modulators 6 and 9 or representative of the amplitude of the signals radiated by antennas 8 and 12.

For the purposes of illustration, it has been assumed that they actually represent the latter and they are therefore displayed as functions of power output in decibels versus time. At (E) is shown the apparent displacement of the source of the signal as a result of the modulation applied by modulators 6 and 9 and the waveforms shown represents the apparent motion of the source about a zero line such as O—O as shown in FIGURE 1 which is on the boresight of the radar system with the vertical axis being a spatial axis representing either actual physical distance between the antennas 12 and 8 or angular relationship between the boresight and the apparent source of the signal.

For illustration it has been shown as an actual physical displacement between limits of plus and minus D about the zero axis versus a horizontal axis time. The apparent source will therefore be seen to move from a point plus D to one side of the zero axis to minus D on the other side of the zero axis as the modulators 6 and 9 gradually vary the output from antennas 8 and 12.

Considering now FIGURE 3, there is shown to a somewhat exaggerated scale, the geometric relationship which it is desired to simulate. It is assumed that the radar system is at point 21 and it is desired to simulate a distributed target extending from point 22 to 23. Line 21, 24 represents the boresight of the radar system. As will be appreciated from a consideration of FIGURE 2 and the waveforms represented therein, the apparent source of the signal moves from one side to the other of the boresight 21, 24 a distance equal to 2(D). This angular motion occurs during the time indicated by dimension 25. In order that the desired simulation may be produced, it is only necessary that the angles subtended by the distance from the boresight to each extremity of the apparent motion, that is from plus D to minus D, be the same angles as that subtended by the target it is desired to simulate, in the geometrical situation shown. Initially this can be accomplished simply by the physical spacing of the two antennas of the test equipment, that is their spacing about the boresight of the radar system and their distance from the radar system itself. The necessary physical arrangement will be found to fall within quite practical limits since normally the angle of view of radar system of this type is quite restricted and may be in the neighborhood for example of six degrees. It will be necessary therefore that the antennas of the test equipment subtend an angle of six degrees with respect to the antenna of the radar system under test. In order to determine dimension 25, it is only necessary to adjust dimension 19 and similarly the dimensions of the ramp functions so that they coincide with dimension 19.

It will be understood that dimension 25 and dimension 19 are in fact equivalent.

Finally it will be appreciated that dimension 19 or 25 will vary with the angle made by the boresight line 21, 24 and the horizontal and will vary depending upon the range, that is will vary depending upon the length of line 21, 24 or dimension 20. These two dimensions being equivalent.

It will also be noted that it is possible to adjust the dimension (D) by changing the waveforms illustrated at 2(C) and (D). It was assumed in the first case that the radiation from the antennas varied from essentially zero to a maximum. If however the modulators never completely eliminate radiation, then the waveforms may be as shown in dotted lines at (C) and (D) in FIGURE 2.

Under these circumstances, the apparent motion of the source will be as shown in dotted lines at (E) in FIGURE 2.

It will be noted that under these circumstances, the apparent motion of the source does not vary all the way from plus D to minus D, but only over a portion of such range.

From the geometry of FIGURE 3, it will also be noted that in fact if the angle 22, 21, 24 equals the angle 24, 21, 23, then the distance 22, 24 does not equal the distance 24, 23 and hence the time required for the desired apparent motion of the source between points 22 and 24 should be less than the time required for the motion between points 24 and 23. If this is not the case, there will be an apparent slight curvature of the line 22, 24 and 23 with point 23 being slightly above the plane surface defined by line 22, 24. In order to eliminate this apparent curvature of the target a correction can be made by decreasing the slope of ramp shown at (C) in FIGURE 2 or increasing the slope of ramp shown at (D) in FIGURE 2. Either of these alternatives will produce a satisfactory result and obviously changes in the apparent contour of the simulated target can be made by adjustment of the slopes.

It has already been indicated that dimension 19 will be determined by dimension 20, always assuming that the angle of the bore-sight 21, 24 to the plane of the simulated target as defined by points 22, and 23, is constant. However, it will be evident that changes in this apparent angle can be made by changing the ratio of dimension 19 with respect to dimension 20. If the radar equipment is for airborne operation, it will be evident that such a change will be equivalent to a change of angle flight of the aircraft relative to the distributed target which may be a simulation of the ground.

As has been previously indicated the apparent source of a signal when radiation is occurring simultaneously from both antennas depends on the relative phase of the microwave energy radiated. The object of the amplitude modulation produced by modulators 6 and 9 is to produce a motion of the apparent source as shown at (E) in FIGURE 2. This object can also be attained by phase modulation of the signals, if the radar equipment under test is of the phase sensing type. In this case modulators 6 and 9 are phase modulators and the waveforms shown at (C) and (D) are representations of phase shift of the signal from a zero reference. By proper selection of the maximum phase shift and the physical antenna spacing in relation to the frequency the apparent source will move as shown at (E) in FIGURE 2. With other values of phase shift it will be possible where desired to cause the apparent source to move a distance greater than 2(D).

An alternate mode of operation of this system is possible for producing a further useful testing mode. For example if it is desired to simulate a moving target rather than a distributed target, it is possible to produce the ramp functions having a much longer duration and slope which represent in fact many times the pulse recurrence period of the radar system and are of such duration as to permit the radar tracking system to follow the gradual transfer of the apparent source of the signal from one antenna to the other. The gradual transfer of the maximum signal strength from one antenna to the other produces primarily an angular motion of the target relative to the radar system. By adding to this a gradual time delay change there can be added to the angular motion a range changing motion or a range change velocity. Hence simulations of targets having compound velocity including both angle and range may be produced. When it is desired only to simulate moving targets it is necessary only to produce a gradual change in signal amplitude between the two antennas. Therefore the modulators used may be of electromechanical structure rather than those necessary for the rapid translation required to simulate a distributed target. Such modulators may, for example, be simply mechanically driven attenuators. As has been indicated, the phase of the radiated signals from both antennas is of great importance and the modulators chosen must be capable of modulating without producing substantial phase shift. Suitable devices for this purpose are ferrite or crystal switches. No complete description has been given here of the remote control device, the signal generator or the surroundings of the test equipment in general. These portions of the system have been more completely described in my co-pending patent application Serial No. 223,865, filed September 4, 1962, entitled, "Radar Testing Equipment," and assigned to the assignee of the present application, but since they are not believed to be a part of this invention, no description is included herein other than to state that obviously in testing radar equipment it must be tested in an area which as closely as possible approximates its normal operating condition. The test antennas should be mounted in an anechoic chamber sufficiently large to substantially simulate a free space condition. The antenna of the radar equipment under test, should also be placed within the anechoic chamber. The signal generator must be designed to produce an nearly as possible a signal identical to that which would be created by a reflection of the energy radiated by the radar transmitter. The remote control device is advantageously connected through long flexible leads to the remainder of the apparatus to enable the operator of the test equipment to observe the operation of the radar equipment while the tests are in progress and control, from the remote control device, various modes of operation of the test equipment.

Signals supplied to the signal generator 5 from terminal 17 must provide information as to the frequency of the radar equipment under test, the pulse recurrence frequency of such equipment and the controls from the remote control device must provide means to control the amplitude of the signal generated by the signal generator and its time of occurrence relative to the pulse transmitted from the radar equipment under test.

What we claim is:

1. A radar test equipment comprising a test area, a plurality of antennas at one end of said test area, an opening at the other end of said test area to receive the antenna of a radar equipment to be tested, a source of radio frequency signals simulating the normal signals produced by reflection of signals from the radar equipment to be tested, transmission paths coupling the source to said antennas and means to simulate a distributed reflecting area comprising means to differentially independently modify the characteristics of said transmission paths periodically at the same pulse recurrence frequency as the pulse recurrence frequency of the pulses of said pulse radar equipment being tested.

2. A radar test equipment comprising a test area, a plurality of antennas at one end of said test area the other end of said test area being arranged to receive the antenna of a radar system, means to derive from the radar system being tested a timing signal representative in phase and periodicity of the signal transmitted by the radar system, a generator producing a test signal corresponding in frequency and amplitude to the signals produced by normal reflection of signals from the radar system being tested and controlled by said timing signal to commence and recur at a phase and pulse recurrence frequency determined by said timing signal, transmission paths coupling the output of said generator to said antennas and means to simulate a distributed reflecting area comprising means interposed in said transmission to modify the characteristics of said paths with a pulse recurrence frequency determined by said timing signal.

3. A radar test equipment comprising an anechoic chamber, a pair of antenna at one end of said chamber, the other end of said chamber arranged to receive the antenna of a radar system being tested, means to produce a timing impulse corresponding in phase and pulse recurrence frequency to the pulse transmitted by said radar system, a signal generator generating a pulse of radio frequency energy of frequency essentially the same as the frequency of energy transmitted by said radar system, of controllable duration, commencing and recurring at a time and pulse recurrence frequency determined by said timing impulse, transmission paths coupling said generator output to said pair of antennas and means to simulate a distributed reflecting area comprising, modulator means interposed in said transmission paths to vary the amplitude of the pulse applied to said antennas, a waveform generator producing waveforms coincident in time with said pulse of radio frequency energy and means to utilize said waveforms to control said modulators.

4. A radar test equipment as claimed in claim 3 wherein said waveforms are a pair of sawtooth waves whereby when the amplitude of the pulse to one of said pair of antennas is at its maximum the amplitude of the pulse to the other of said pair of antennas is at its minimum and vice versa.

5. A radar test equipment as claimed in claim 4 wherein the slopes of the sawtooth waves are not reciprocal but are correlated to produce the desired curvature of the simulated distributed target.

References Cited by the Examiner
UNITED STATES PATENTS

| | | | |
|---|---|---|---|
| 3,060,424 | 10/62 | Hansen | 343—17.7 |
| 3,110,026 | 11/63 | Barbour et al. | 343—17.7 |
| 3,138,797 | 6/64 | Steinberg | 343—17.7 |

CHESTER L. JUSTUS, *Primary Examiner.*